(12) United States Patent
Tsuda et al.

(10) Patent No.: US 9,799,110 B2
(45) Date of Patent: Oct. 24, 2017

(54) ABNORMALITY DETECTION METHOD AND BLAST FURNACE OPERATION METHOD

(71) Applicant: JFE STEEL CORPORATION, Tokyo (JP)

(72) Inventors: Kazuro Tsuda, Tokyo (JP); Takehide Hirata, Tokyo (JP); Naoshi Yamahira, Tokyo (JP); Hidekazu Abe, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 160 days.

(21) Appl. No.: 14/899,486

(22) PCT Filed: Jun. 18, 2014

(86) PCT No.: PCT/JP2014/066195
§ 371 (c)(1),
(2) Date: Dec. 17, 2015

(87) PCT Pub. No.: WO2015/015936
PCT Pub. Date: Feb. 5, 2015

(65) Prior Publication Data
US 2016/0148365 A1    May 26, 2016

(30) Foreign Application Priority Data

Jul. 29, 2013  (JP) ................................ 2013-156834
Jul. 29, 2013  (JP) ................................ 2013-156835

(51) Int. Cl.
*G06T 7/00*   (2017.01)
*G06K 9/62*   (2006.01)
(Continued)

(52) U.S. Cl.
CPC ............ *G06T 7/0004* (2013.01); *C21B 5/006* (2013.01); *C21B 7/24* (2013.01); *F27B 1/16* (2013.01);
(Continued)

(58) Field of Classification Search
None
See application file for complete search history.

(56) References Cited

U.S. PATENT DOCUMENTS

| 5,481,247 A | 1/1996 | Alexander et al. |
| 2002/0051579 A1* | 5/2002 | Dugue ............... G06T 7/97 382/228 |

(Continued)

FOREIGN PATENT DOCUMENTS

| CN | 2680677 Y | 2/2005 |
| CN | 102021260 A | 4/2011 |

(Continued)

OTHER PUBLICATIONS

Szatvanyi, G., C. Duchesne, and G. Bartolacci. "Multivariate image analysis of flames for product quality and combustion control in rotary kilns." Industrial & engineering chemistry research 45.13 (2006): 4706-4715.*

(Continued)

*Primary Examiner* — Nathan Bloom
(74) *Attorney, Agent, or Firm* — Oliff PLC

(57) ABSTRACT

An abnormality detection method of detecting abnormality of a blast furnace from tuyere images shot by cameras installed in vicinities of a plurality of tuyeres of the blast furnace includes: collecting, in a time-series manner, representative brightness vectors defined by representative brightnesses determined based on brightness values of respective pixels for each of the tuyeres image previously shot by the cameras at a same time; extracting a principal (Continued)

component vector by performing principal component analysis on the representative brightness vectors collected in the time-series manner; calculating, as an evaluation value, a length of a normal line drawn in a direction of the principal component vector from the representative brightness vector collected from the tuyere images shot by the cameras at the same time during an operation; and detecting the abnormality of the blast furnace by comparing the evaluation value with a predetermined threshold.

16 Claims, 15 Drawing Sheets

(51) Int. Cl.
| | |
|---|---|
| F27D 21/02 | (2006.01) |
| G06K 9/46 | (2006.01) |
| G06T 7/60 | (2017.01) |
| F27D 1/16 | (2006.01) |
| F27B 1/28 | (2006.01) |
| F27B 1/16 | (2006.01) |
| F27D 1/18 | (2006.01) |
| F27D 21/00 | (2006.01) |
| C21B 7/24 | (2006.01) |
| C21B 5/00 | (2006.01) |

(52) U.S. Cl.
CPC .................. *F27B 1/28* (2013.01); *F27D 1/16* (2013.01); *F27D 1/18* (2013.01); *F27D 21/00* (2013.01); *F27D 21/02* (2013.01); *G06K 9/4661* (2013.01); *G06K 9/6269* (2013.01); *G06T 7/60* (2013.01); *F27D 2021/026* (2013.01); *G06T 2207/10016* (2013.01); *G06T 2207/20076* (2013.01)

(56) References Cited

U.S. PATENT DOCUMENTS

| | | | |
|---|---|---|---|
| 2006/0074598 A1* | 4/2006 | Emigholz | C10G 47/36 |
| | | | 702/185 |
| 2010/0270714 A1 | 10/2010 | Tsai et al. | |
| 2011/0180978 A1* | 7/2011 | Goedert | C21B 5/003 |
| | | | 266/47 |
| 2013/0028470 A1 | 1/2013 | Kanda | |

FOREIGN PATENT DOCUMENTS

| | | |
|---|---|---|
| CN | 202755005 | 2/2013 |
| CN | 103177437 A | 6/2013 |
| EP | 2286166 A1 | 2/2011 |
| EP | 3012331 A1 | 4/2016 |
| JP | S62-63605 A | 3/1987 |
| JP | H05-186811 A | 7/1993 |
| JP | H05-256705 A | 10/1993 |
| JP | H07-305105 A | 11/1995 |
| JP | H09-111318 A | 4/1997 |
| JP | 2001-290508 A | 10/2001 |
| JP | 2002-309307 A | 10/2002 |
| JP | 2004-183956 A | 7/2004 |
| LU | 90610 A1 | 1/2002 |
| WO | 2009/141419 A1 | 11/2009 |

OTHER PUBLICATIONS

Wang, Jie-Sheng, and Xiu-Dong Ren. "GLCM based extraction of flame image texture features and KPCA-GLVQ recognition method for rotary kiln combustion working conditions." International Journal of Automation and Computing 11.1 (2014): 72-77.*

C. Duchesne, J.J. Liu, J.F. MacGregor, Multivariate image analysis in the process industries: A review, Chemometrics and Intelligent Laboratory Systems, vol. 117, 2012, pp. 116-128, ISSN 0169-7439, http://dx.doi.org/10.1016/j.chemolab.2012.04.003. (http://www.sciencedirect.com/science/article/pii/S0169743912000792).*

Yu, H. and MacGregor, J. F. (2004), Monitoring flames in an industrial boiler using multivariate image analysis. AIChE J., 50: 1474-1483. doi:10.1002/aic.10164.*

Naoshi Yamahira ; Takehide Hirata ; Kazuro Tsuda ; Yasuyuki Morikawa ; Yousuke Takata; Anomaly detection of blast furnace condition using tuyere cameras . Proc. SPIE 9971, Applications of Digital Image Processing XXXIX, 997113 (Sep. 27, 2016); doi:10.1117/12.2237716.*

Birk, Wolfgang, Olov Marklund, and Alexander Medvedev. "Video monitoring of pulverized coal injection in the blast furnace." IEEE Transactions on Industry Applications 38.2 (2002): 571-576.*

Sep. 5, 2016 Office Action issued in Chinese Patent Application No. 201480041242.3.

Feb. 23, 2017 Search Report issued in European Patent Application No. 14832268.8.

* cited by examiner

ABNORMALITY DETECTION METHOD AND BLAST FURNACE OPERATION METHOD

FIELD

The present invention relates to an abnormality detection method and a blast furnace operation method of detecting abnormality of a blast furnace from a tuyere image shot by a camera installed in the vicinity of a tuyere of the blast furnace.

BACKGROUND

As one of criteria in order to execute a stable blast furnace operation, brightness information of a raceway portion in a blast furnace that is observed through a tuyere of the blast furnace is employed. The brightness information includes pieces of information important in an operation of the blast furnace, such as a level of furnace heat, a combustion degree of pulverized coal, and drop information of non-melted iron ore. Observation of the brightness information through the tuyere is performed by sensory inspection in which an operator looks into an observation window approximately several times per day. In recent years, a camera is installed in the vicinity of the tuyere and images (tuyere images) shot by the camera are displayed on a monitor in a monitoring room so as to be centrally monitored in increased cases (for example, see Patent Document 1).

Note that a plurality of tuyeres are provided in the circumferential direction of the blast furnace. In any of the cases where the operator directly looks into the observation window and where the operator centrally monitors in the monitoring room, the operator pays particular attention to variation of the brightness information for a plurality of tuyeres in the circumferential direction of the blast furnace (deviation of the brightness in the blast furnace circumferential direction) so as to intuitively detect generation of abnormality in the vicinity of the respective tuyeres.

Patent Document 2 discloses a technique of adjusting a ratio between non-melted iron ore and coke that are put into a furnace from a furnace top based on a drop frequency detected by attaching cameras and brightness meters at equal to or more than three places among a plurality of tuyeres in the blast furnace circumferential direction and computing the number of times of drop of the non-melted iron ore from the upper side at the respective places.

Furthermore, Patent Document 3 discloses a method of providing combustion performance of pulverized coal by performing image processing on temperature distribution in a tuyere image shot by a radiation temperature camera as a technique replacing the sensory inspection by an operator. In the technique disclosed in Patent Document 3, the temperature distribution in the tuyere obtained by the radiation temperature camera is divided into a plurality of regions and a temperature-based area ratio, a black portion (pulverized coal uncombusted band) area ratio, and the like are digitized for each region so as to index the combustion performance of the pulverized coal.

CITATION LIST

Patent Document

Patent Document 1: Japanese Patent Application Laid-open No. 2004-183956

Patent Document 2: Japanese Patent Application Laid-open No. 5-186811

Patent Document 3: Japanese Patent Application Laid-open No. 5-256705

SUMMARY

Technical Problem

The above-mentioned technique disclosed in Patent Document 2 uses tuyere images formed by shooting the vicinities of the tuyeres in order to detect the number of times of drop of the non-melted iron ore in the blast furnace thoroughly and does not detect the above-mentioned deviation of the brightness information in the blast furnace circumferential direction to which the operator pays particular attention in order to detect the abnormality of the blast furnace.

Furthermore, various unanticipated conditions other than the abnormality capable of being digitized as the temperature-based area ratio and the like as disclosed in Patent Document 3 can be generated in the vicinities of the tuyeres. In addition, the method using the area ratio as the index has the following problem. That is, change in the brightness information in the tuyere image in which the area ratio itself does not largely vary, such as abnormality (for example, abnormality in the PCI flow direction, which will be described later) appearing in the tuyere image due to movement of a position with the tuyere image that is shot, cannot be detected.

The present invention has been made in order to solve the above-mentioned problems and an object of the present invention is to provide an abnormality detection method and a blast furnace operation method capable of automatically detecting deviation of brightness information in a blast furnace circumferential direction. Furthermore, another object of the invention is to provide an abnormality detection method and a blast furnace operation method capable of detecting different conditions from a normal condition that are generated in the vicinity of a tuyere with high accuracy.

Solution to Problem

To solve the above-described problem and achieve the object, an abnormality detection method according to one aspect of the present invention is an abnormality detection method of detecting abnormality of a blast furnace from tuyere images shot by cameras installed in vicinities of a plurality of tuyeres of the blast furnace, and includes: a collecting step of collecting, in a time-series manner, representative brightness vectors defined by representative brightnesses determined based on brightness values of respective pixels for each of the tuyeres image previously shot by the cameras at a same time; an extracting step of extracting a principal component vector by performing principal component analysis on the representative brightness vectors collected in the time-series manner; a calculating step of calculating, as an evaluation value, a length of a normal line drawn in a direction of the principal component vector from the representative brightness vector collected from the tuyere images shot by the cameras at the same time during an operation; and a detecting step of detecting the abnormality of the blast furnace by comparing the evaluation value with a predetermined threshold.

To solve the above-described problem and achieve the object, an abnormality detection method according to another aspect of the present invention is an abnormality detection method of detecting abnormality of a blast furnace from a tuyere image shot by a camera installed in a vicinity of a tuyere of the blast furnace, and includes: a collecting step of collecting, in a time-series manner, representative brightness vectors defined by representative brightnesses determined based on brightness values of respective pixels for a plurality of areas formed by dividing a region of the tuyere image previously shot by the camera into the areas; an extracting step of extracting a principal component vector by performing principal component analysis on the representative brightness vectors collected in the time-series manner; a calculating step of calculating, as an evaluation value, a length of a normal line drawn in a direction of the principal component vector from the representative brightness vector collected from the tuyere image shot by the camera during an operation; and a detecting step of detecting the abnormality of the blast furnace by comparing the evaluation value with a predetermined threshold.

Advantageous Effects of Invention

According to the present invention, deviation of brightness information in the blast furnace circumferential direction can be detected automatically. In addition, different conditions from a normal condition that are generated in the vicinity of a tuyere can be detected with high accuracy.

DESCRIPTION OF EMBODIMENTS

Figure 1:
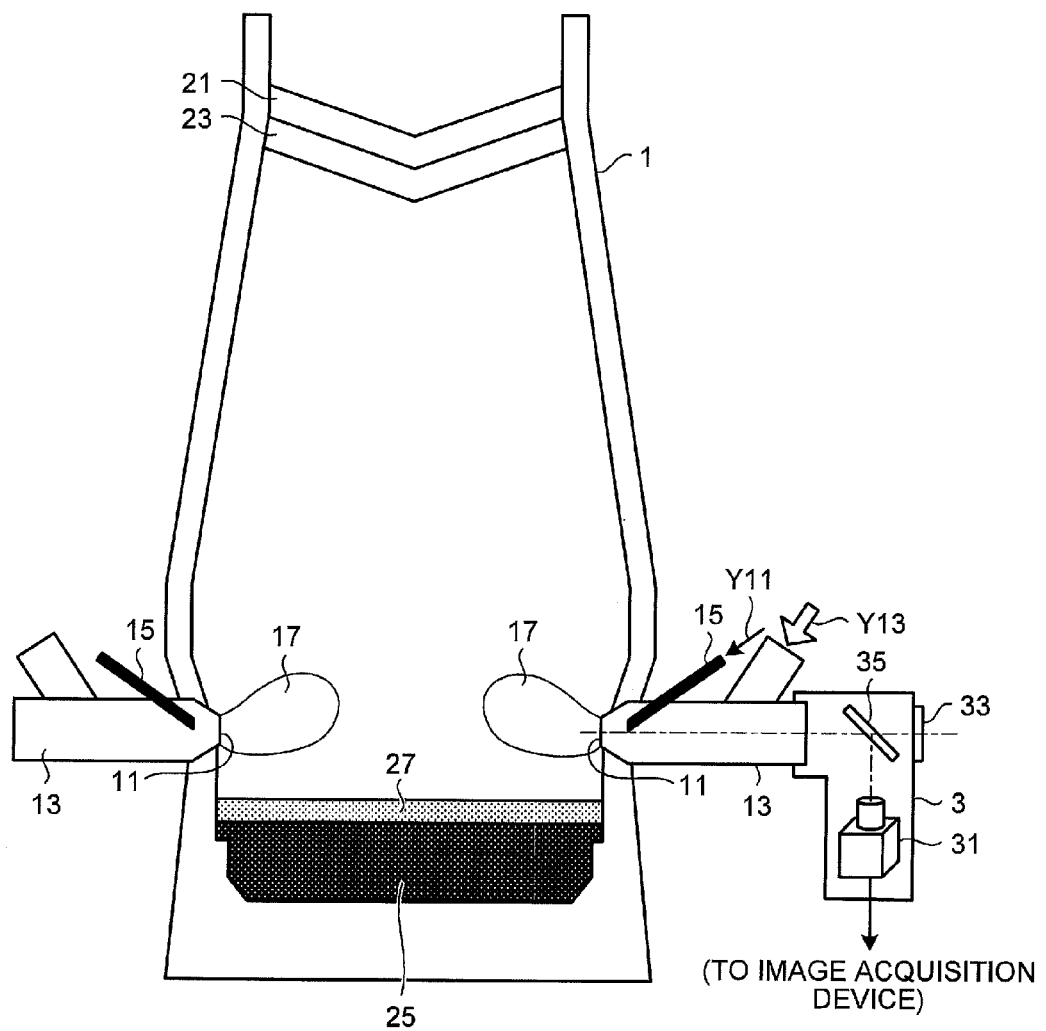
FIG. 1 is a plan view schematically illustrating an example of the schematic configuration of a blast furnace to which an abnormality detection device is applied.

Hereinafter, embodiments of an abnormality detection method and a blast furnace operation method according to the invention will be described with reference to the drawings. It should be noted that the embodiments do not limit the invention. In illustration of the drawings, the same reference numerals denote the same portions.

FIG. 1 is a plan view schematically illustrating an example of the schematic configuration of a blast furnace 1 to which an abnormality detection device 10 (see FIG. 2 and FIG. 11) in the embodiment is applied. As illustrated in FIG. 1, the blast furnace 1 charges iron ore 21 and coke 23 from a furnace top and separates a provided hot metal 25 from slag 27 at the furnace bottom so as to discharge the hot metal 25 to the outside of the furnace. Hot air is brown into the blast furnace 1 through tuyeres 11 provided at lower portions of the furnace and the iron ore 21 is reduced and dissolved using the coke 23 as a heat source. With these pieces of processing, the hot metal 25 is provided. The slag 27 has a specific gravity lower than that of the hot metal 25 and is therefore separated as a layer above the hot metal 25.

In the blast furnace 1, one ends of blast tubes 13 for blasting the hot air are connected to the tuyeres 11. Lances 15 are installed on the halfway of the blast tubes 13 so as to penetrate through the blast tubes 13 and the pulverized coal is put into the hot air through the lance 15 (arrow Y11). The hot air (arrow Y13) blasted in the blast tubes 13 and the pulverized coal are introduced into the blast furnace 1 through the tuyeres 11 and contribute to combustion in combustion spaces called raceways 17 at the forward side of the tuyeres 11 in the hot air blasting directions mainly.

Tuyere observation units 3 are installed at the other end sides of the blast tubes 13 that oppose the tuyeres 11. Each tuyere observation unit 3 is configured by installing and unitizing a tuyere camera (camera) 31 for shooting a condition of the blast furnace 1 during the operation, to be specific, a state in the blast tube 13 and a state (furnace condition) in the blast furnace 1 through the tuyere 11, an observation window 33 through which the condition of the blast furnace 1 is observed visually, and a half mirror 35 for bifurcating a light path as indicated by a dashed-dotted line in FIG. 1 into the tuyere camera 31 side and the observation window 33 side.

The tuyeres 11 are provided so as to be aligned in the circumferential direction of the blast furnace 1. The tuyere observation units 3 are installed at the other end sides of all or some of the blast tubes 13 one ends of which are connected to the tuyeres 11. Each of the tuyere cameras 31 of the tuyere observation units 3 configures the abnormality detection device 10.

[First Embodiment]

Figure 2:
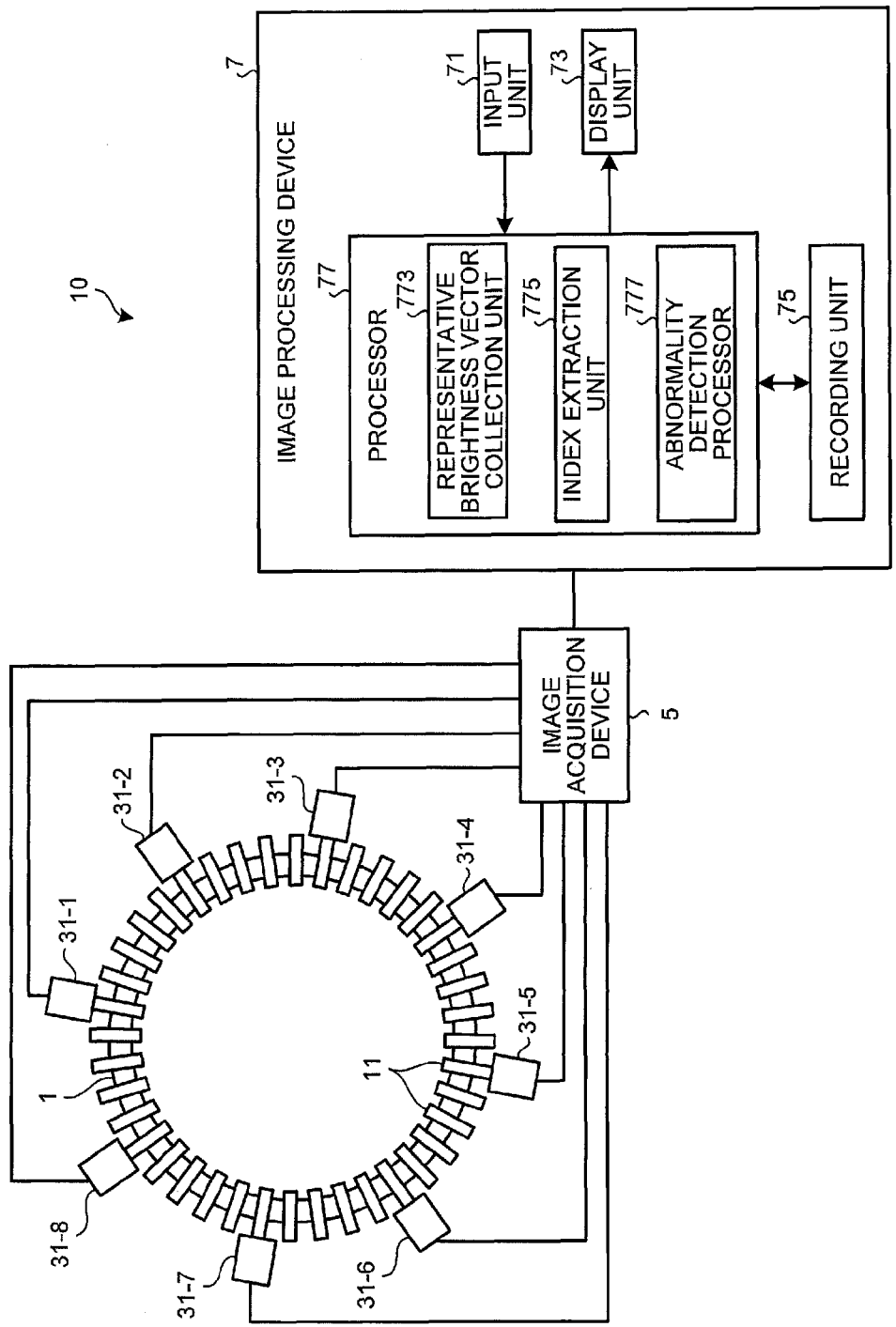
FIG. 2 is a plan view schematically illustrating an example of the configuration of the abnormality detection device according to a first embodiment.

First, abnormality detection processing by the abnormality detection device 10 in a first embodiment will be described. FIG. 2 is a plan view schematically illustrating an example of the configuration of the abnormality detection device 10 in the embodiment. FIG. 2 also illustrates a positional relation between the tuyeres 11 aligned in the circumferential direction of the blast furnace 1 and the tuyere cameras 31 installed as the tuyere observation units 3. In the embodiment, as illustrated in FIG. 2, the tuyere cameras 31 (31-1 to 31-8) are installed for eight tuyeres 11 selected at a substantially equal interval along the circumferential direction of the blast furnace 1. Each tuyere camera 31 outputs image data of a tuyere image formed by shooting a condition of the blast furnace 1 to an image acquisition device 5, which will be described later, as needed. It is sufficient that the tuyere cameras 31 are installed for at least a plurality of tuyeres 11, and the tuyeres 11 for which the tuyere cameras 31 are installed and the number of tuyere cameras 31 may be appropriately set.

The abnormality detection device 10 includes the tuyere cameras 31 installed for the (for example, eight) tuyeres 11 as described above, the image acquisition device 5, and an image processing device 7. The image acquisition device 5 and the image processing device 7 are configured by a general-purpose computer such as a workstation and a personal computer.

The image acquisition device 5 intakes the pieces of image data of the tuyere images (moving images) that are continuously shot by the respective tuyere cameras 31 while the blast furnace 1 is operated as needed and transfers them to the image processing device 7.

The image processing device 7 includes, as main functional units, an input unit 71, a display unit 73, a recording unit 75, and a processor 77.

The input unit 71 is used to input information necessary for abnormality detection and the like of the blast furnace 1 and outputs an input signal in accordance with operation input to the processor 77. The input unit 71 is configured by an input device such as a keyboard, a mouse, a touch panel, or switches of various types. The display unit 73 is used to display the tuyere images that are shot by the respective tuyere cameras 31 on a monitor and make notification of abnormality and the like of the blast furnace 1, for example, and displays screens of various types based on a display signal input from the processor 77. The display unit 73 is configured by a display device such as a liquid crystal display (LCD), an electroluminescent (EL) display, and a cathode-ray tube (CRT) display.

The recording unit 75 is configured by an information recording medium such as an updatable and recordable flash memory, a hard disk incorporated or connected with a data communication terminal, and a memory card, a reading and writing device thereof, or the like, and a recording device in accordance with an intended use can be applied and used therefor appropriately. A program operating the image processing device 7 and executing various functions of the image processing device 7, pieces of data that are used in execution of the program, and the like are previously recorded or temporarily recorded every processing in the recording unit 75.

The processor 77 is configured by a central processing unit (CPU) or the like and issues instructions to the respective units configuring the image processing device 7, transfers pieces of data thereto, and so on based on the input signal input from the input unit 71, and the program, the pieces of data, and the like that are recorded in the recording unit 75 so as to control operations of the image processing device 7. The processor 77 includes a representative brightness vector collection unit 773, an index extraction unit 775, and an abnormality detection processor 777. The processor 77 performs image processing on the tuyere images and monitors the condition of the blast furnace 1 so as to detect abnormality of the blast furnace 1.

Figure 3:
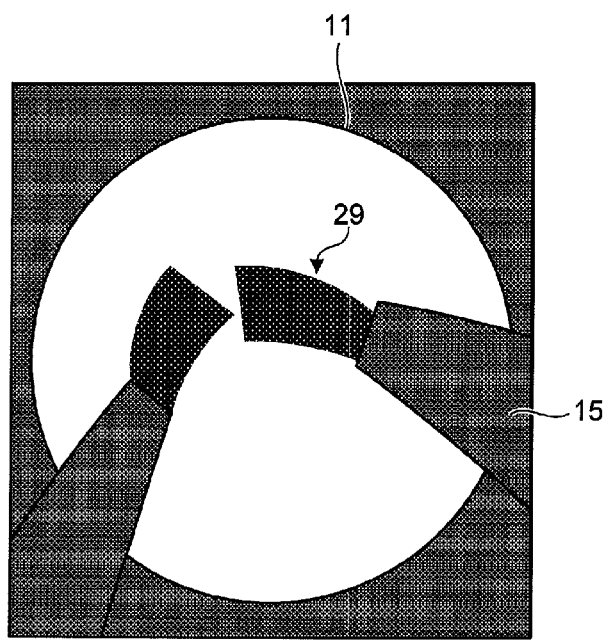
FIG. 3 is a plan view schematically illustrating an example of a tuyere image.

Next, the principle of the abnormality detection of the blast furnace 1 that is performed by the abnormality detection device 10 will be described. FIG. 3 is a plan view schematically illustrating an example of the tuyere image. As illustrated in FIG. 3, in each tuyere image, a condition in the blast furnace 1 during combustion at the far side of the tuyere 11, the lance 15 at the near side of the tuyere 11, and pulverized coal 29 put into the furnace through the lance 15 are shot in a smoke-like form. As described above, the brightness information in the tuyere image like this includes pieces of information important in the operation of the blast furnace 1, such as the level of furnace heat, the combustion degree of the pulverized coal, and the drop information of the non-melted iron ore. The respective tuyere cameras 31-1 to 31-8 shoot similar tuyere images when the condition of the blast furnace 1 is normal.

On the other hand, when a different condition from the normal condition (in the specification, referred to as "abnormality") is generated, a brightness value is decreased or increased in a tuyere image with the generated abnormality shot.

Figure 4:
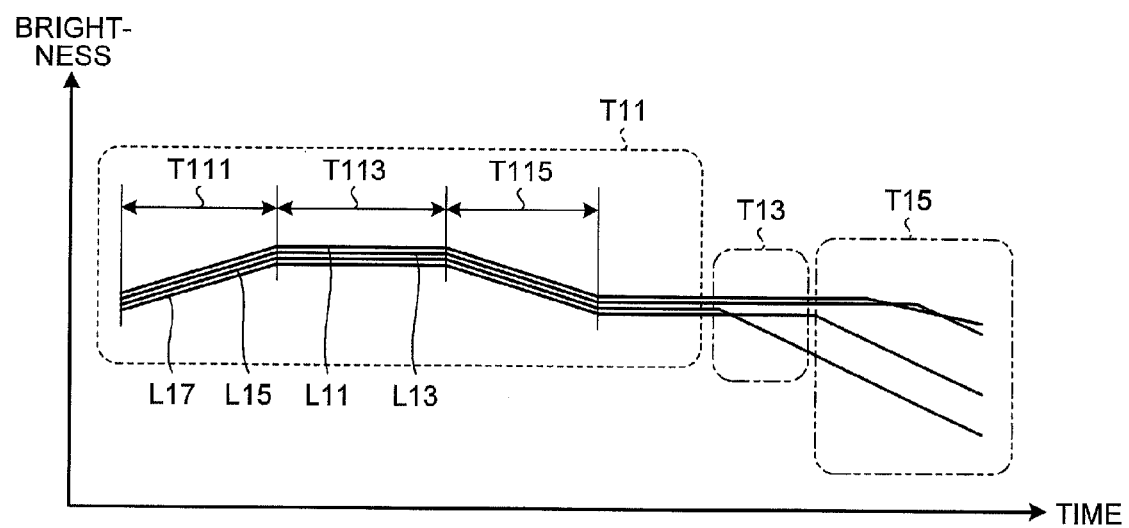
FIG. 4 is a view illustrating an example of time-series changes in brightness values of tuyere images.

FIG. 4 is a view illustrating an example of time-series changes in the brightness value that are provided from the tuyere images of the tuyeres 11. FIG. 4 illustrates brightness value changes L11, L13, L15, and L17 provided from four tuyere images.

In the normal condition, the changes in the brightness value in the tuyere images indicate regularity in accordance with ordinal furnace heat change (normal furnace condition change) occurring with time shift. For example, as indicated in a period T11 surrounded by a dashed line in FIG. 4, the brightness values in the respective tuyere images change while drawing similar trajectories although the values are different somewhat. Specifically, the brightness values are gradually increased in all the tuyere images in a period T111 during which the temperature in the blast furnace 1 tends to increase, the brightness value changes are flat in a period T113 during which the temperature in the blast furnace 1 is kept, and the brightness values are gradually decreased in a period T115 during which the temperature in the blast furnace 1 tends to decrease.

As indicated in a period T13 surrounded by a dashed-dotted line in FIG. 4, when furnace condition change (abnormal furnace condition change) due to generation of abnormality occurs in a part of the blast furnace 1, the direction of the brightness value change L15 in the tuyere image with the shot abnormal furnace condition change is partially deviated from the direction of the normal furnace condition change that is drawn by the brightness value changes L11, L13, and L17 in other tuyere images. Furthermore, as indicated in a period T15 surrounded by a dashed-two dotted line in FIG. 4, when the abnormality is generated in the entire blast furnace 1 and the abnormal furnace condition change is enlarged, the directions of the brightness value changes L11, L13, L15, and L17 in the respective tuyere images are deviated from the direction of the normal furnace condition change wholly and the brightness value changes L11, L13, L15, and L17 indicate individual change tendencies.

As the type of the abnormality appearing in the time-series change in the brightness value as described above, various types can be considered in addition to abnormality in the furnace heat change in the specific tuyere 11 or all the tuyeres 11, abnormality in the combustion degree of the pulverized coal, and abnormality due to the drop of the non-melted iron ore. For example, the case where the lance 15 is broken in the blast tube 13 is considered (time of lance breakage). When the lance 15 is broken and is deviated from a shooting range of the tuyere camera 31, and so on, a state of the far side of the tuyere 11 that has been blocked by the lance 15 comes to be shot. For this reason, in this case, a high-brightness region in the image is increased in comparison with the tuyere image in the normal condition. As another abnormality, the case where a molten matter level (that is, the upper surface level of the slag 27) in the blast furnace 1 is elevated beyond a liquid level safe in the operation is considered (time of elevation of the molten slag). The elevation of the molten matter level possibly causes an operation trouble such as erosion of the tuyeres 11. When the molten matter level reaches the shooting range of the tuyere cameras 31, the tuyere cameras 31 shoot the elevation state of the slag 27. For this reason, in this case, low-brightness regions in the images are increased. Moreover, as another abnormality, the case where the scattering direction of the pulverized coal that is put into the furnace through the lance 15 changes (time of an abnormal PCI flow direction). Also in this case, the brightness values in the images vary between before and after the change.

In the embodiment, the above-mentioned time-series changes in the brightness value that are provided from the respective tuyere images are focused and an index is extracted previously (index extraction processing). In order to perform the processing, first, a set of pieces of vector information (representative brightness vector) $V(t)$ as expressed by the following equation (1) is collected while representative brightnesses determined for respective 8 tuyere images shot during the operation are set to representative brightnesses of the tuyere cameras 31-1 to 31-8 that have shot the corresponding tuyere images.

$$\text{Representative brightness vector } V(t) = \begin{bmatrix} \text{Representative brightness of camera 31-1} \\ \text{Representative brightness of camera 31-2} \\ \text{Representative brightness of camera 31-3} \\ \text{Representative brightness of camera 31-4} \\ \text{Representative brightness of camera 31-5} \\ \text{Representative brightness of camera 31-6} \\ \text{Representative brightness of camera 31-7} \\ \text{Representative brightness of camera 31-8} \end{bmatrix} \quad (1)$$

As the representative brightness, for example, a maximum value (maximum brightness), a minimum value (minimum brightness), an average value (average brightness), an intermediate value (intermediate brightness), or the like of the brightness values of respective pixels in the corresponding tuyere image can be used. It is sufficient that an optimum value in accordance with the type of the abnormality to be detected is selected as the value of the representative brightness.

Figure 5:
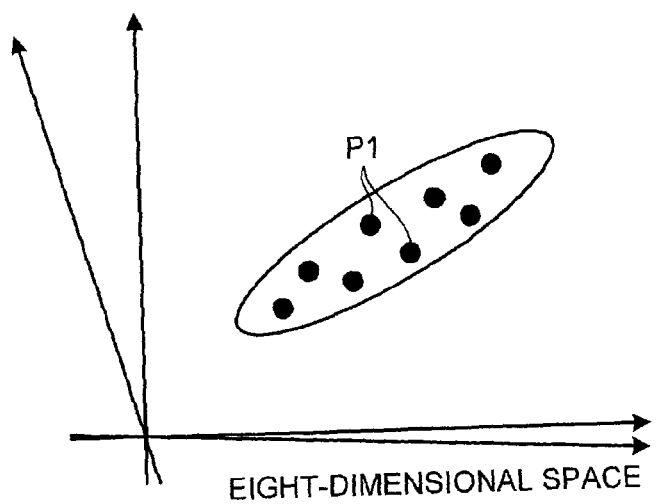
FIG. 5 is a view illustrating an example of distribution of time-series representative brightness vectors in an eight-dimensional space.

The representative brightness vector $V(t)$ that is collected as described above can be expressed by one point in an N-dimensional space (N is the number of the tuyere cameras 31; eight-dimensional space in the embodiment). FIG. 5 is a view illustrating an example of distribution of the time-series representative brightness vectors $V(t)$ in the eight-dimensional space. When the sufficient number of representative brightness vectors $V(t)$ are collected, points P1 in the eight-dimensional space that express the representative brightness vectors $V(t)$ collected from the tuyere images in the normal condition are distributed into an ellipsoidal form dispersed in the main principal component direction of the representative brightness vectors $V(t)$, that is, in the direction of the normal furnace condition change in the brightness value.

Figure 6:
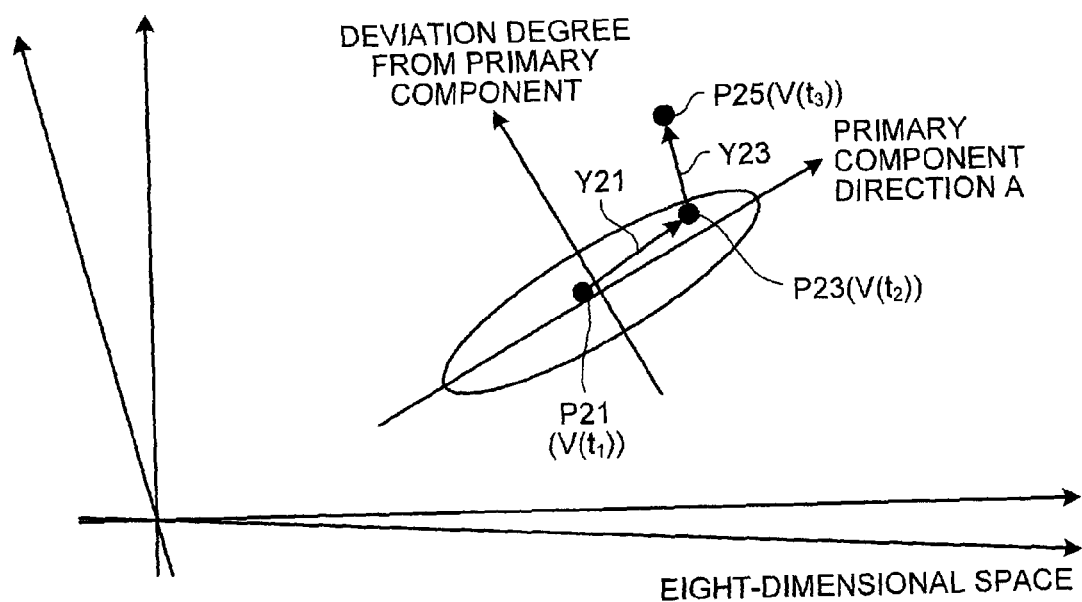
FIG. 6 is a view for explaining a principal component direction and a deviation direction from a principal component.

FIG. 6 is a view for explaining a principal component direction A and a deviation degree from the principal component. Among the points expressing the representative brightness vectors $V(t)$, a point P21 in the normal condition is distributed in the ellipsoidal form dispersed in the principal component direction A (long-axis direction of the ellipsoid) of a representative brightness vector $V(t_1)$. For example, when the brightness change as illustrated in FIG. 5 occurs in a range of the normal operation, a point P23 expressing a representative brightness vector $V(t_2)$ is present in the ellipsoidal-form distribution in the same manner. In contrast, one or a plurality of representative brightness(es) change(s) in the unanticipated direction deviated from the direction of the normal furnace condition change in the abnormal condition, and components (hereinafter referred to as "deviated components") deviated from the principal components that are orthogonal to the principal component direction A are therefore increased. Accordingly, a point P25 expressing a representative brightness vector $V(t_3)$ in occurrence of the abnormal furnace condition change in a part of the blast furnace 1 as in the period T13 in FIG. 4 is deviated from the ellipsoidal-form distribution in the anticipated change direction thereof (arrow Y23).

In the index extraction processing, principal component analysis is performed on the sufficient number of representative brightness vectors $V(t)$ collected as described above and the deviation degree from the principal component direction A is extracted as the index.

Figure 7:
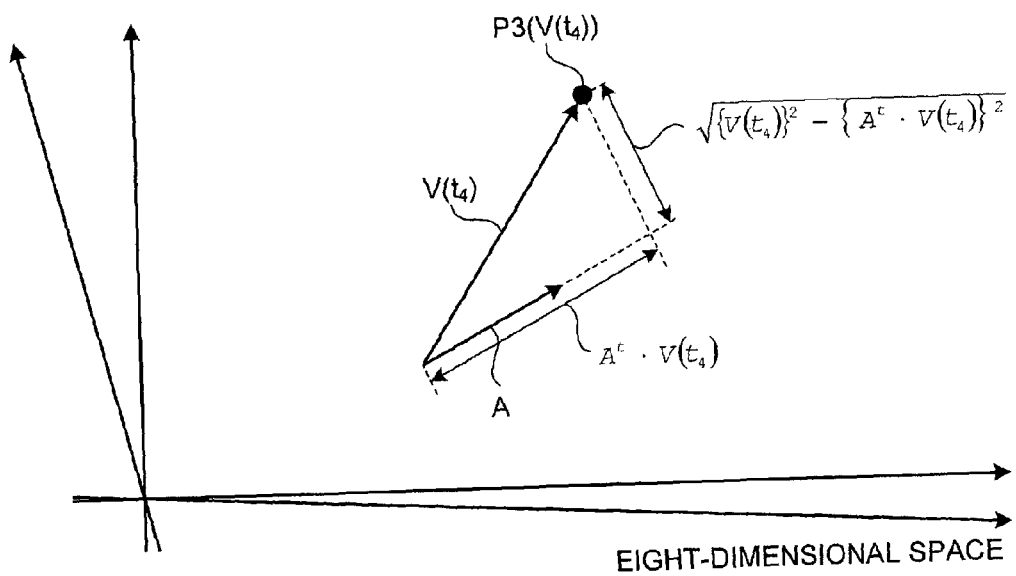
FIG. 7 is a descriptive view for explaining calculation of an evaluation value.

When the abnormality is detected, the representative brightness vector $V(t)$ is collected from the tuyere images that are shot during the operation in the same manner as needed and threshold processing is performed on an evaluation value so as to detect the abnormality of the blast furnace 1 (abnormality detection processing). FIG. 7 is a descriptive view for explaining calculation of the evaluation value and FIG. 8 is a view for explaining abnormality determination using the evaluation value.

For example, as illustrated in FIG. 7, a representative brightness vector $V(t_4)$ expressed by a point P3 is newly collected during the operation. The evaluation value is computed by $\sqrt{[\{V(t_4)\}^2 - \{A^t \cdot V(t_4)\}^2]}$ using an inner product $A^t \cdot V(t_4)$ of the collected representative brightness vector $V(t_4)$ and the principal component vector A (unit vector of the length 1). The evaluation value is the length of a normal line drawn from the representative brightness vector V(t₄) in the principal component vector A direction and expresses the deviation degree of the representative brightness vector V(t₄) from the principal component direction. As the deviation degree is increased (change in the unanticipated direction is increased), the evaluation value is increased.

Figure 8:
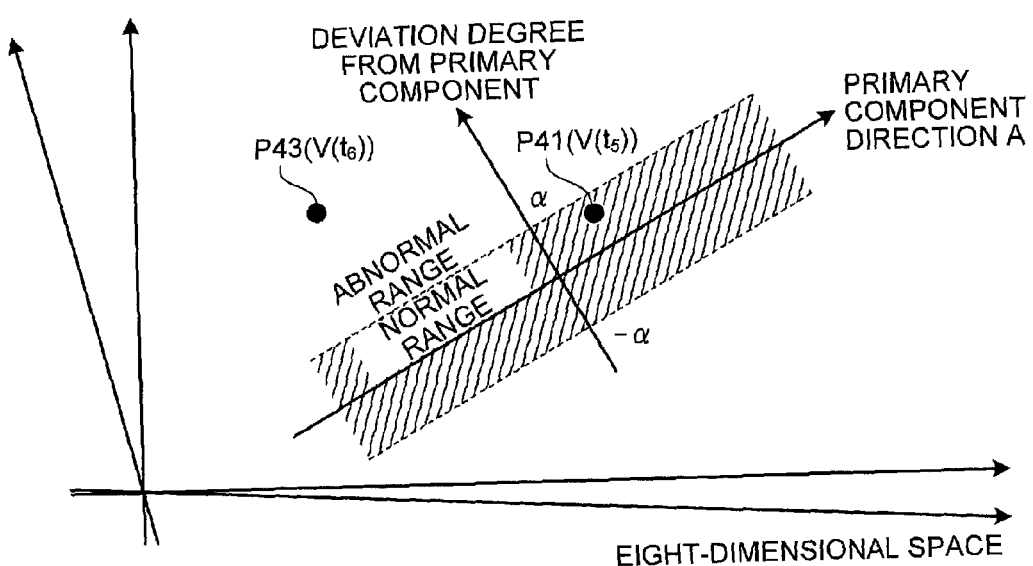
FIG. 8 is a view for explaining abnormality determination using the evaluation value.

In the abnormality determination using the evaluation value, abnormality is determined based on whether the evaluation value, that is, a ratio of the components deviated from the principal component belongs to a normal range previously defined as a threshold range of equal to or larger than −α and equal to or smaller than a as indicated by a hatched portion in FIG. 8 or belongs to an abnormal range out of the threshold range. For example, when the evaluation value is within the threshold range as in a representative brightness vector V(t₅) that is expressed by a point P41 in the eight-dimensional space, the condition of the blast furnace 1 is determined to be normal. On the other hand, when the evaluation value is out of the threshold range as in a representative brightness vector V(t₅) that is expressed by a point P43, the condition of the blast furnace 1 is determined to be abnormal.

Figure 9:
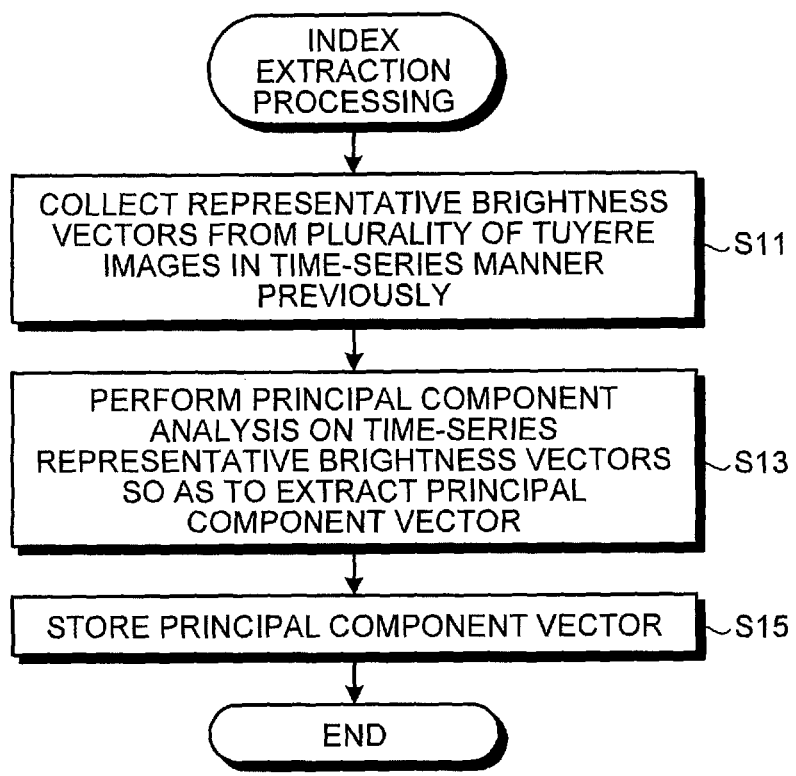
FIG. 9 is a flowchart illustrating processing procedures of index extraction processing.
Figure 10:
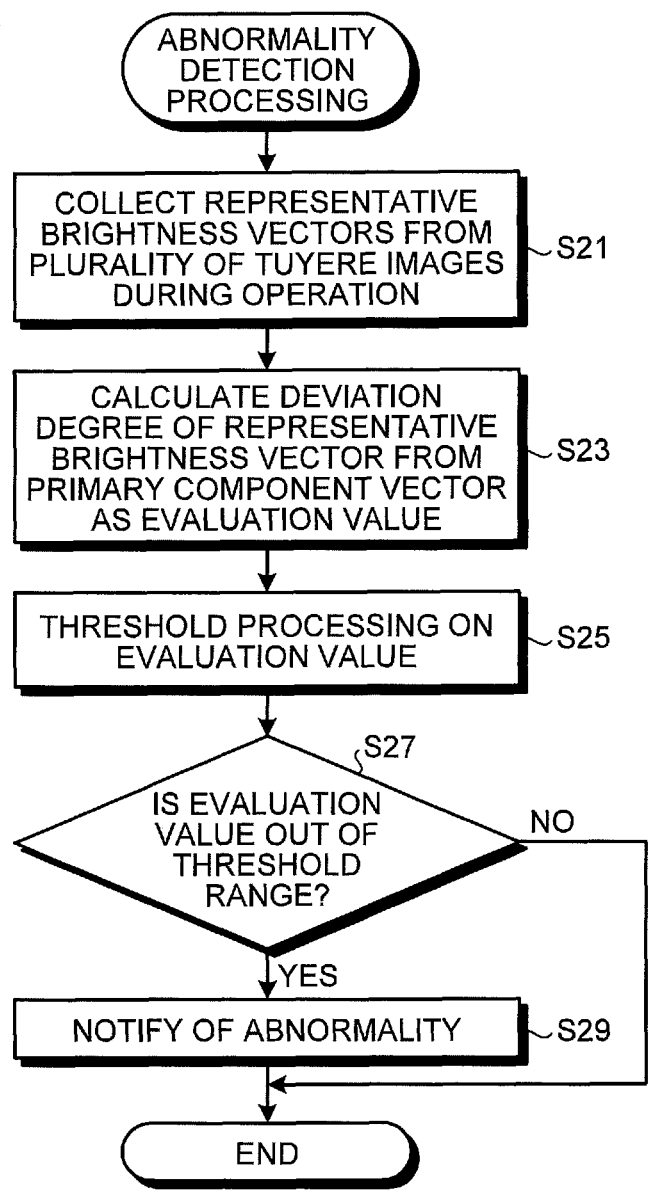
FIG. 10 is a flowchart illustrating processing procedures of abnormality detection processing.

Next, detailed processing procedures that are performed by the abnormality detection device 10 will be described. FIG. 9 is a flowchart illustrating processing procedures of the index extraction processing that is performed by the image processing device 7. FIG. 10 is a flowchart illustrating processing procedures of the abnormality detection processing that is performed by the image processing device 7. After the image processing device 7 performs the index extraction processing in accordance with the processing procedures in FIG. 9 in advance, the image processing device 7 performs the abnormality detection processing in accordance with the processing procedures in FIG. 10. With these pieces of processing, the abnormality detection device 10 executes an abnormality detection method and a blast furnace operation method.

That is to say, in the index extraction processing, as illustrated in FIG. 9, the representative brightness vector collection unit 773 first collects the representative brightness vector V(t) from eight tuyere images that are transferred from the image acquisition device 5 at a timing with a predetermined time interval, for example, previously (step S11; collection step). To be specific, the representative brightness vector collection unit 773 determines the representative brightnesses based on the brightness values of the respective pixels for the eight tuyere images shot by the respective tuyere cameras 31 at the corresponding timing so as to provide the representative brightness vector V(t) as expressed by the above-mentioned equation (1) defined by the determined representative brightnesses of the eight tuyere images. Then, the representative brightness vector collection unit 773 collects the representative brightness vectors V(t) for a predetermined period of time so as to collect a series of the representative brightness vectors V(t) in the time-series manner.

At a subsequent step S13, the index extraction unit 775 performs the principal component analysis on the series of representative brightness vectors V(t) collected in the past operation as described above so as to extract the principal component vector A (extraction step). Then, the index extraction unit 775 stores the extracted principal component vector A in the recording unit 75 (step S15).

In the operation after the index extraction processing performed as described above, the abnormality detection processing as illustrated in FIG. 10 is executed at a predetermined time interval, for example. In the abnormality detection processing, first, pieces of processing at step S21 to step S23 are performed as a calculation step. That is to say, the representative brightness vector collection unit 773 first collects the representative brightness vector V(t) from eight tuyere images transferred from the image acquisition device 5 at the corresponding timing with the same, procedure as that at step S11 in FIG. 9 (step S21). Thereafter, the abnormality detection processor 777 reads the principal component vector A from the recording unit 75 and calculates $\sqrt{\{V(t)\}^2 - \{A^t \cdot V(t)\}^2}$ as the evaluation value using an inner product $A^t \cdot V(t)$ of the representative brightness vector V(t) collected at step S21 and the read principal component vector A (step S23).

Subsequently, pieces of processing at step S25 to step S27 are performed as an abnormality detection step. That is to say, the abnormality detection processor 777 performs threshold processing on the evaluation value calculated at step S23 (step S25) so as to determine whether the evaluation value is within the predetermined threshold range based on the following equation (2) (step S27).

$$0 \leq \sqrt{\{V(t)\}^2 - \{A^t \cdot V(t)\}^2} \leq \alpha \qquad (2)$$

When the evaluation value is out of the threshold range (Yes at step S27), the abnormality detection processor 777 determines that abnormality has been generated in the blast furnace 1 and performs processing of warning of and displaying the abnormality on the display unit 73 (step S29). It is sufficient that the processing enables the operator to be notified of at least the generation of the abnormality in the blast furnace 1 and a warning sound may be output from an output device such as a speaker so as to notify the operator of the generation of the abnormality alternatively. Furthermore, an operation condition of the blast furnace 1 is controlled in accordance with the determination whether the abnormality has been generated in the blast furnace 1 at step S29 so as to address the generated abnormality.

As described above, in the embodiment, the principal component analysis is performed on the representative brightness vector V(t) formed by a set of eight representative brightnesses of the tuyere images shot by the tuyere cameras 31-1 to 31-8 at the same time and the principal component vector A is extracted as the index. Then, the deviation degree from the principal component that is computed by the inner product of the representative brightness vector V(t) collected during the operation and the principal component vector A, and the like, is calculated as the evaluation value so as to detect generation of the abnormality.

With these pieces of processing, when the brightness value unevenly changes in the unanticipated direction different from the direction of the normal furnace condition change in a part or all of the tuyere images shot by the tuyere cameras 31-1 to 31-8 in the vicinities of the tuyeres 11 installed in the circumferential direction of the blast furnace 1, generation of a condition (abnormality) different from the condition of the blast furnace 1 in the normal condition can be detected in the blast furnace 1 during the operation. Accordingly, the deviation of the brightness information in the circumferential direction of the blast furnace 1 that the operator has intuitively detected by viewing the vicinities of the respective tuyeres 11 by looking into the observation windows 33 or centrally monitoring the tuyere images in the vicinities of the respective tuyeres 11 in the monitoring room conventionally can be detected automatically.

[Second Embodiment]

Figure 11:
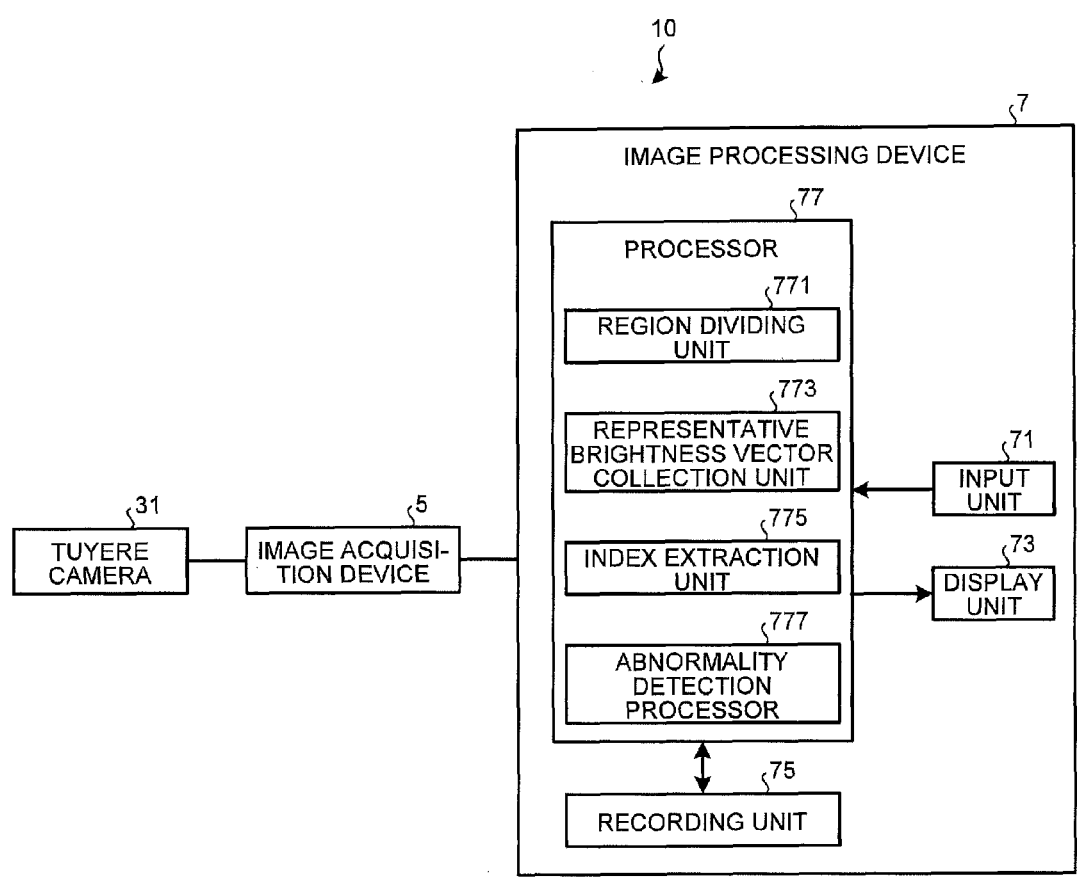
FIG. 11 is a plan view schematically illustrating an example of the configuration of an abnormality detection device according to a second embodiment.

Next, abnormality detection processing by the abnormality detection device 10 in a second embodiment will be described. FIG. 11 is a plan view schematically illustrating an example of the configuration of the abnormality detection device 10 in the embodiment. The abnormality detection device 10 includes the tuyere camera 31 installed as the tuyere observation unit 3 for any one of the tuyeres 11 aligned in the circumferential direction of the blast furnace 1, the image acquisition device 5, and the image processing device 7. The image acquisition device 5 and the image processing device 7 are configured by a general-purpose computer such as a workstation and a personal computer. It should be noted that the tuyere 11 for which the tuyere camera 31 is installed may be appropriately set.

The tuyere camera 31 outputs image data of a tuyere image formed by shooting a condition of the blast furnace 1 to the image acquisition device 5 as needed. The image acquisition device 5 intakes pieces of image data of the tuyere images (moving images) that are continuously shot by the tuyere camera 31 while the blast furnace 1 is operated as needed and transfers them to the image processing device 7.

The image processing device 7 includes, as main functional units, the input unit 71, the display unit 73, the recording unit 75, and the processor 77.

The input unit 71 is used to input information necessary for abnormality detection and the like of the blast furnace 1 and outputs an input signal in accordance with operation input to the processor 77. The input unit 71 is configured by an input device such as a keyboard, a mouse, a touch panel, or switches of various types. The display unit 73 is used to display the tuyere images that are shot by the tuyere camera 31 on a monitor and make notification of abnormality and the like of the blast furnace 1, for example, and displays screens of various types based on a display signal input from the processor 77. The display unit 73 is configured by a display device such as an LCD, an EL display, and a CRT display.

The recording unit 75 is configured by an information recording medium such as an updatable and recordable flash memory, a hard disk incorporated or connected with a data communication terminal, and a memory card, a reading and writing device thereof, or the like, and a recording device in accordance with an intended use can be applied and used therefor appropriately. A program operating the image processing device 7 and executing various functions of the image processing device 7, pieces of data that are used in execution of the program, and the like are previously recorded, or temporarily recorded for each processing, in the recording unit 75.

The processor 77 is configured by a CPU or the like and issues instructions to the respective units configuring the image processing device 7, transfers pieces of data thereto, and so on based on the input signal input from the input unit 71, and the program, the pieces of data, and the like that are recorded in the recording unit 75 so as to control operations of the image processing device 7. The processor 77 includes a region dividing unit 771, the representative brightness vector collection unit 773, the index extraction unit 775, and the abnormality detection processor 777. The processor 77 performs image processing on the tuyere images and monitors the condition of the blast furnace 1 so as to detect abnormality of the blast furnace 1.

Next, the principle of the abnormality detection of the blast furnace 1 that is performed by the abnormality detection device 10 will be described. In each tuyere image, a condition in the blast furnace 1 during combustion at the far side of the tuyere 11, the lance 15 at the near side of the tuyere 11, and the pulverized coal put into the furnace through the lance 15 are shot in a smoke-like form. As described above, the brightness information of the tuyere image like this includes pieces of information important in the operation of the blast furnace 1, such as the level of furnace heat, the combustion degree of the pulverized coal, and the drop information of the non-melted iron ore. For example, when a different condition from the normal condition (in the specification, referred to as "abnormality"), such as abnormality in the furnace heat change, abnormality in the combustion degree of the pulverized coal, and abnormality due to the drop of the non-melted iron ore, is generated in the blast furnace 1, a brightness value in the tuyere image is decreased or increased partially between before and after the generation of the abnormality.

Figure 12:
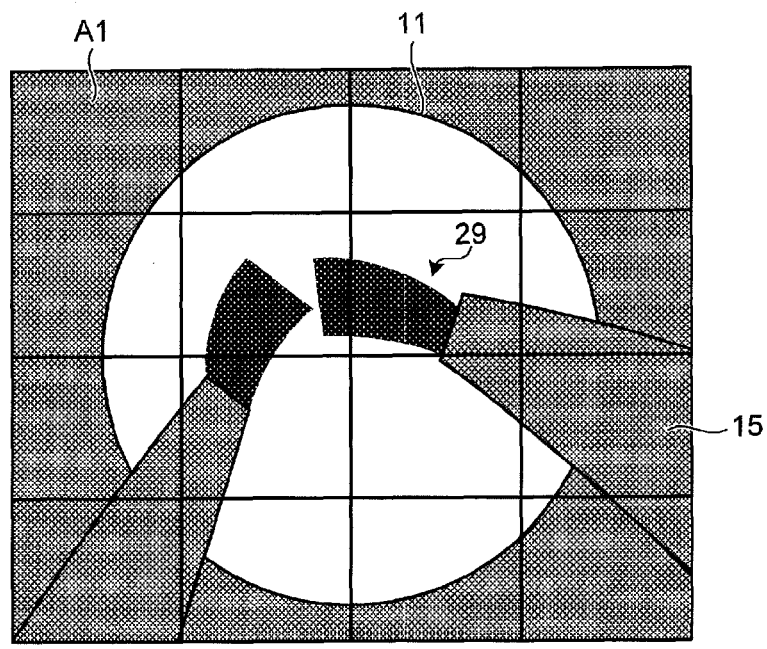
FIG. 12 is a view illustrating an example of region division of a tuyere image.
Figure 13:
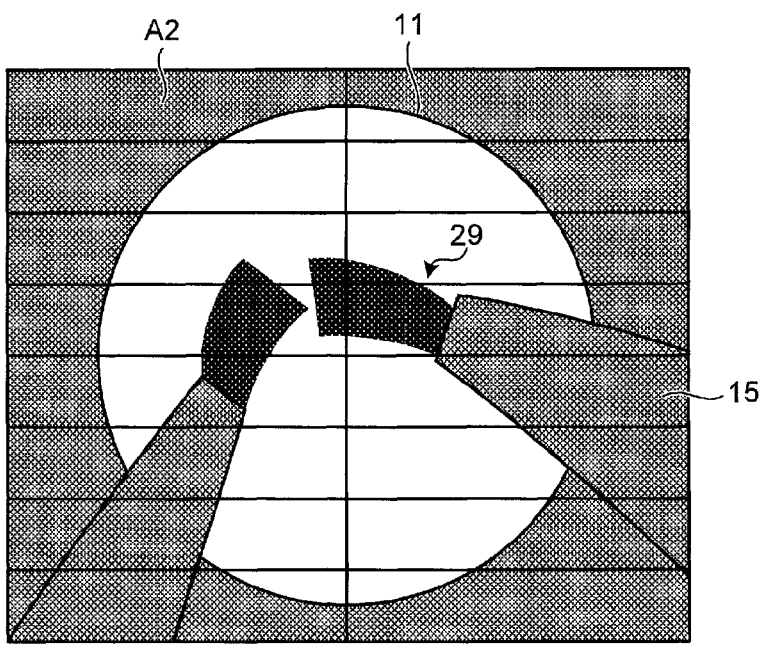
FIG. 13 is a view illustrating another example of the region division of the tuyere image.

In the embodiment, the partial change in the brightness value that is provided from the tuyere images is focused and an index is extracted previously (index extraction processing). In order to perform the processing, first, each tuyere image shot during the operation is divided into a plurality of areas. FIG. 12 and FIG. 13 are views illustrating examples of region division of the tuyere image and schematically illustrate the tuyere 11, the lance 15, the pulverized coal 29, and the like that are shot into the tuyere image. In FIG. 12, the tuyere image is region-divided into 16 areas A1 each having a substantially square shape. On the other hand, in FIG. 13, the tuyere image is region-divided into (landscape) 16 areas A2 each having a rectangular shape having a smaller width in the up-down direction.

The drop of the non-melted iron ore that occurs in the blast furnace 1 is focused on herein. The dropping non-melted iron ore appears on an upper portion and moves downward in the tuyere images. When seen in the time-series manner, the partial changes in the brightness value in this case occur downward from the upper portion in the tuyere images. In the embodiment, abnormality is detected based on the change in the brightness value for each of the areas formed by the region division. That is, when the partial changes in the brightness value in the tuyere images when seen in the time-series manner as described above have directivity, the detection accuracy of the abnormality can be improved by making a division width in the corresponding direction smaller. Accordingly, when the drop of the non-melted iron ore is desired to be detected, region division with the small division width in the up-down direction as illustrated in FIG. 13 is preferably employed. In contrast, a large division width in the right-left direction can reduce wrong detection of the abnormality due to noise.

It should be noted that the shape of each area formed by the region division is not limited to the shapes as illustrated in FIG. 12 and FIG. 13 and the size of each area may be appropriately set. Hereinafter, the tuyere image is region-divided into the 16 areas A1 as illustrated in FIG. 12 and the 16 areas A1 are expressed as A1-1, 2, 3, . . . , and 16 appropriately.

Figure 14:
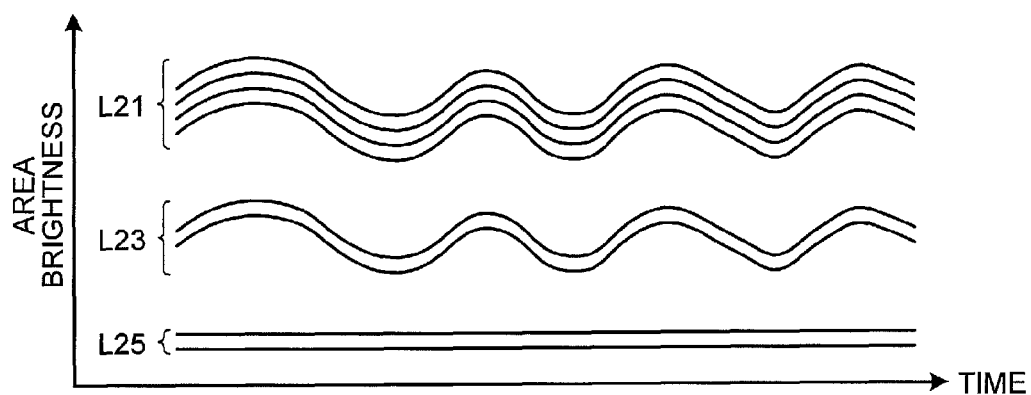
FIG. 14 is a view illustrating an example of time-series changes in a brightness value for respective areas that are provided from tuyere images in a normal condition.

FIG. 14 is a view illustrating an example of the time-series changes in the brightness value for the respective areas that are provided from the tuyere images in the normal condition. FIG. 14 illustrates eight brightness value changes provided from eight areas. As illustrated in FIG. 14, in each of the tuyere images, for example, a high-brightness portion L21 formed in a bright area where the far side of the tuyere 11 is shot and an intermediate-brightness portion L23 and a low-brightness portion L25 formed by shooting an inner portion of the blast tube 13 at the near side of the tuyere 11, the smoke-like pulverized coal, and the like are mixed. In the normal condition, the brightness value changes L21, L23, and L25 in all the areas draw trajectories in accordance with ordinal condition change (regular furnace condition change) occurring with time shift while keeping substantially the equivalent brightness value levels.

In contrast, when the furnace condition change (abnormal furnace condition change) due to generation of abnormality occurs in the vicinity of the tuyere 11 for which the tuyere camera 31 is installed, the direction of the brightness value change in a specific area where the abnormal furnace condition change has been shot is partially deviated from the direction of the normal furnace condition change drawn by the brightness value changes in other areas having the substantially equivalent brightness value levels.

Figure 15:
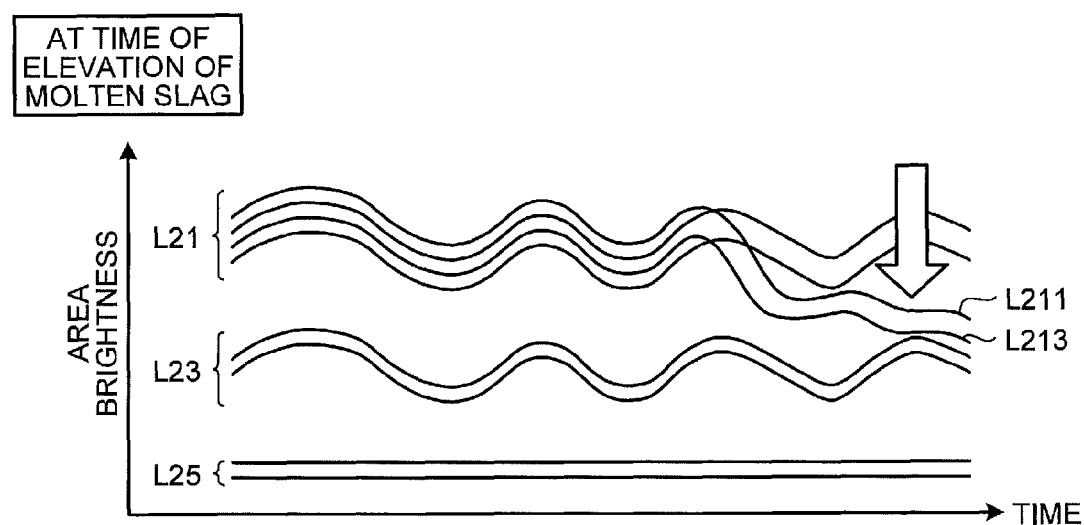
FIG. 15 is a view illustrating an example of the time-series changes in the brightness value for the respective areas at the time of elevation of the molten slag.

As the type of the abnormality appearing in the time-series change in the brightness value, various types can be considered in addition to abnormality in the furnace heat change, abnormality in the combustion degree of the pulverized coal, and abnormality due to the drop of the non-melted iron ore as described above. For example, there is the case where a molten matter level (that is, the upper surface level of the slag 27) in the blast furnace 1 is elevated beyond a liquid level safe in the operation (time of elevation of the molten slag). The elevation of the molten matter level possibly causes an operation trouble such as erosion of the tuyeres 11. FIG. 15 is a view illustrating an example of the brightness value changes for the respective areas at the time of the elevation of the molten slag. When the molten matter level reaches the shooting range of the tuyere camera 31, the tuyere camera 31 shoots the elevation state of the slag 27. For this reason, in this case, the brightness value is decreased, for example, in areas where the elevation state of the slag 27 has been shot in comparison with that in the normal condition. As a result, as illustrated in FIG. 15, the directions of brightness value changes L211 and L213 in the corresponding areas are partially deviated from the directions of the normal furnace condition changes that are drawn by the other brightness value changes L21 having the equivalent levels and are drastically decreased.

Figure 16:
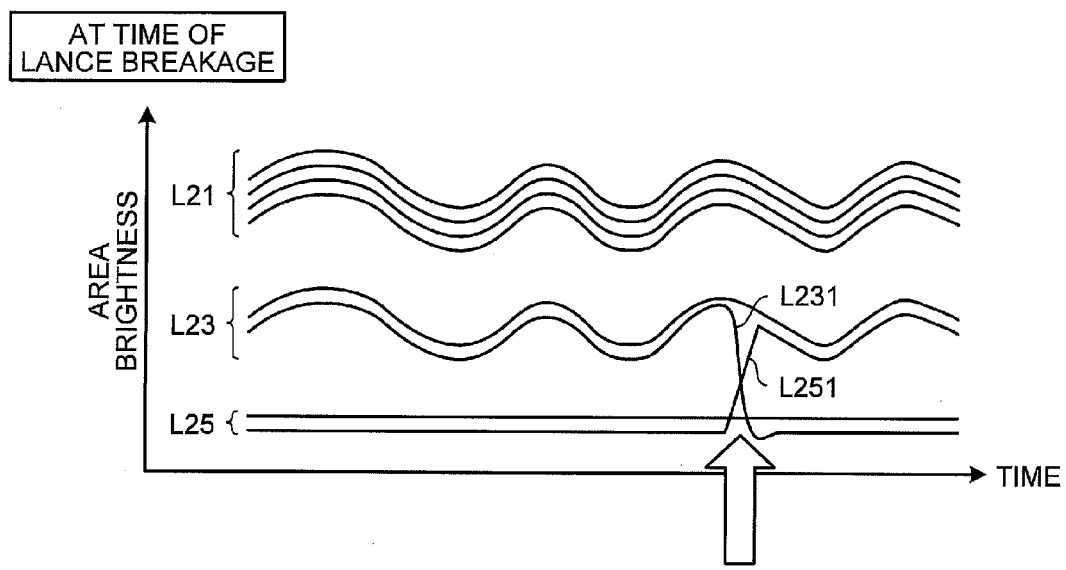
FIG. 16 is a view illustrating an example of the time-series changes in the brightness value for the respective areas at the time of lance breakage.

Moreover, as another abnormality, the case where the lance 15 is broken in the blast tube 13 is considered (time of lance breakage). FIG. 16 is a view illustrating an example of the brightness value changes for the respective areas at the time of lance breakage. For example, when the lance 15 is broken and the position thereof in the tuyere image in which the broken lance 15 is shot is moved, a state of the far side of the tuyere 11 that has been blocked by the lance 15 comes to be shot in a certain area. For this reason, in this case, the brightness value is increased in the area. On the other hand, the state of the far side of the tuyere 11 is blocked and the brightness value is decreased in another area. As a result, as illustrated in FIG. 16, the directions of brightness value changes L231 and L251 in the areas where the above-mentioned states have been shot are partially deviated from the direction of the normal furnace condition change that is drawn by the other brightness value change L23 having the equivalent level and is drastically decreased and partially deviated from the direction of the normal furnace condition change that is drawn by the other brightness value change L25 having the equivalent level and is drastically increased.

Figure 17:
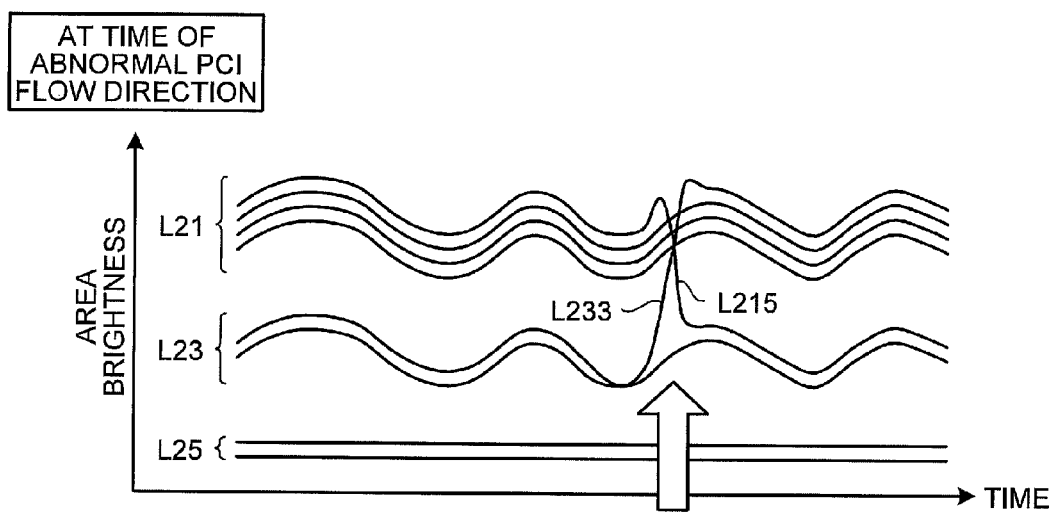
FIG. 17 is a view illustrating an example of changes in the brightness value for the respective areas at the time of an abnormal PCI flow direction.

Moreover, as another abnormality, the case where the scattering direction of the pulverized coal that is put into the furnace through the lance 15 changes (time of an abnormal PCI flow direction) is considered. FIG. 17 is a view illustrating an example of the brightness value changes for the respective areas at the time of an abnormal PCI flow direction. Also at the time of the abnormal PCI flow direction, the appearance manner of the far side of the tuyere 11 changes and the level of the brightness value therefore varies in the specific area. For example, as illustrated in FIG. 17, in an area where the scattering direction of the pulverized coal has changed and the state of the far side of the tuyere 11 has come to be shot, the direction of brightness value change L233 is partially deviated from the direction of the normal furnace condition change that is drawn by the other brightness value change L23 and is drastically increased. In contrast, in an area where the state of the far side of the tuyere 11 has come to be blocked, the direction of brightness value change L215 is partially deviated from the directions of the normal furnace condition changes that are drawn by the other brightness value changes L21 having the equivalent levels and is drastically decreased.

In the index extraction processing, a set of pieces of vector information (representative brightness vector) V(t) as expressed by the following equation (3) is collected while representative brightnesses determined for the respective areas are set to representative brightnesses of the areas A1-1, 2, 3, . . . , and 16.

$$\text{Representative brightness vector } V(t) = \begin{bmatrix} \text{Representative brightness of area } A1\text{-}1 \\ \text{Representative brightness of area } A1\text{-}2 \\ \text{Representative brightness of area } A1\text{-}3 \\ \vdots \\ \text{Representative brightness of area } A1\text{-}16 \end{bmatrix} \quad (3)$$

As the representative brightness, for example, a maximum value (maximum brightness), a minimum value (minimum brightness), an average value (average brightness), an intermediate value (intermediate brightness), or the like of the brightness values of respective pixels in the corresponding tuyere image can be used. It is sufficient that an optimum value in accordance with the type of the abnormality to be detected is selected as the value of the representative brightness.

Figure 18:
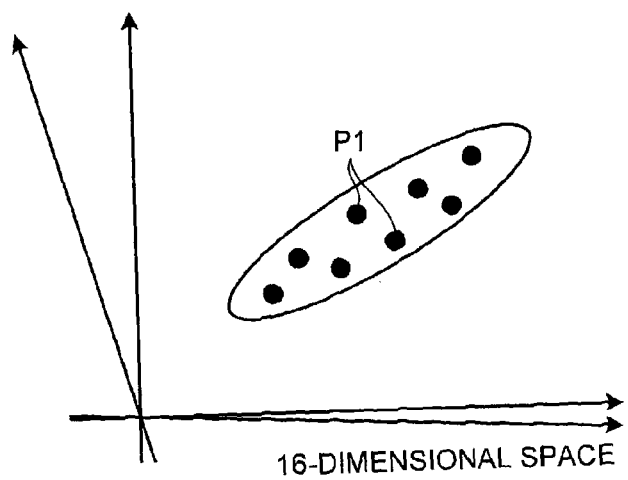
FIG. 18 is a view illustrating an example of distribution of time-series representative brightness vectors in a 16-dimensional space.

The representative brightness vector V(t) that is collected as described above can be expressed by one point in an N-dimensional space (N is the number of divided areas; 16-dimensional space in the embodiment). FIG. 18 is a view illustrating an example of distribution of the time-series representative brightness vectors V(t) in the 16-dimensional space. When the sufficient number of representative brightness vectors V(t) are collected, points P1 in the 16-dimensional space that express the representative brightness vectors V(t) collected from the tuyere images in the normal condition are distributed into an ellipsoidal form dispersed in the principal component direction of the representative brightness vectors V(t), that is, in the direction of the normal furnace condition change in the brightness value.

Figure 19:
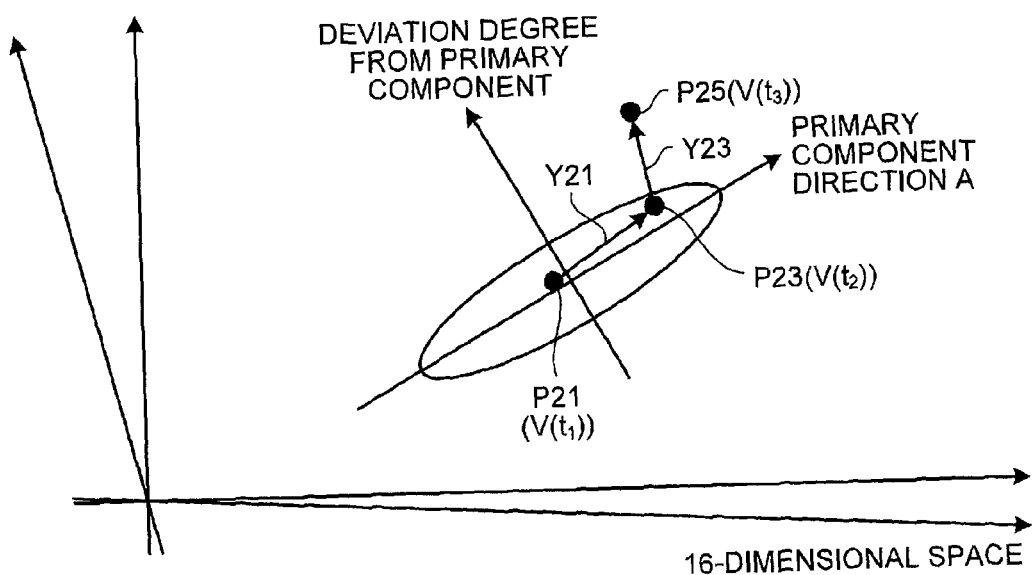
FIG. 19 is a view for explaining a principal component direction and a deviation degree from a principal component.

FIG. 19 is a view for explaining a principal component direction A and a deviation degree from the principal component. Among the points expressing the representative brightness vectors V(t), a point P21 in the normal condition is distributed in the ellipsoidal form dispersed in the principal component direction A (long-axis direction of the ellipsoid) of a representative brightness vector $V(t_1)$ as described above. For example, when the brightness change as illustrated in FIG. 14 occurs in a range of the normal operation, a point P23 expressing a representative brightness vector $V(t_2)$ is present in the ellipsoidal-form distribution in the same manner. In contrast, one or a plurality of representative brightness(es) change(s) in the unanticipated direction deviated from the direction of the normal furnace condition change in the abnormal condition, and components (hereinafter referred to as "deviated components") deviated from the principal component that are orthogonal to the principal component direction A are therefore increased. Accordingly, a point P25 expressing a representative brightness vector $V(t_3)$ in occurrence of the abnormal furnace condition change in a part of the vicinity of the tuyere 11 that is shot into the tuyere images is deviated from the ellipsoidal-form distribution in the anticipated change direction thereof (arrow Y23).

In the index extraction processing, principal component analysis is performed on the sufficient number of representative brightness vectors $V(t)$ collected as described above and the deviation degree from the principal component direction A is extracted as the index.

Figure 20:
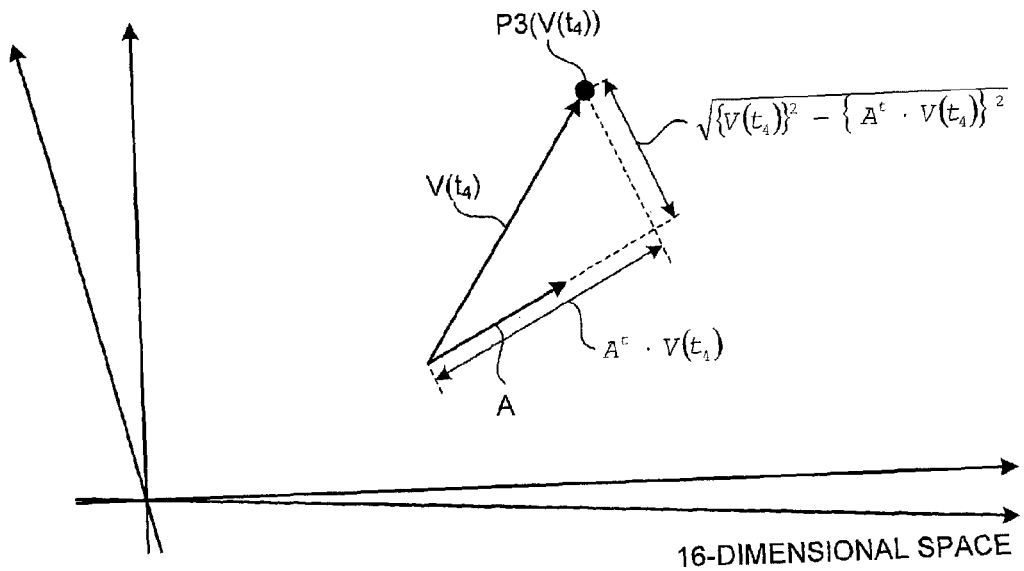
FIG. 20 is a descriptive view for explaining calculation of an evaluation value.

When the abnormality is detected, the representative brightness vector $V(t)$ is collected from the tuyere image that is shot during the operation in the same manner as needed and threshold processing is performed on an evaluation value so as to detect abnormality of the blast furnace 1 (abnormality detection processing). FIG. 20 is a descriptive view for explaining calculation of the evaluation value and FIG. 21 is a view for explaining abnormality determination using the evaluation value.

For example, as illustrated in FIG. 20, a representative brightness vector $V(t_4)$ expressed by a point P3 is newly collected during the operation. The evaluation value is computed by $\sqrt{[\{V(t_4)\}^2 - \{A^t \cdot v(t_4)\}^2]}$ using an inner product $A^t \cdot V(t_4)$ of the collected representative brightness vector $V(t_4)$ and the principal component vector A (unit vector of the length 1). The evaluation value is the length of a normal line drawn from the representative brightness vector $V(t_4)$ in the principal component vector A direction and expresses the deviation degree of the representative brightness vector $V(t_4)$ from the principal component direction. As the deviation degree is increased (change in the unanticipated direction is increased), the evaluation value is increased.

Figure 21:
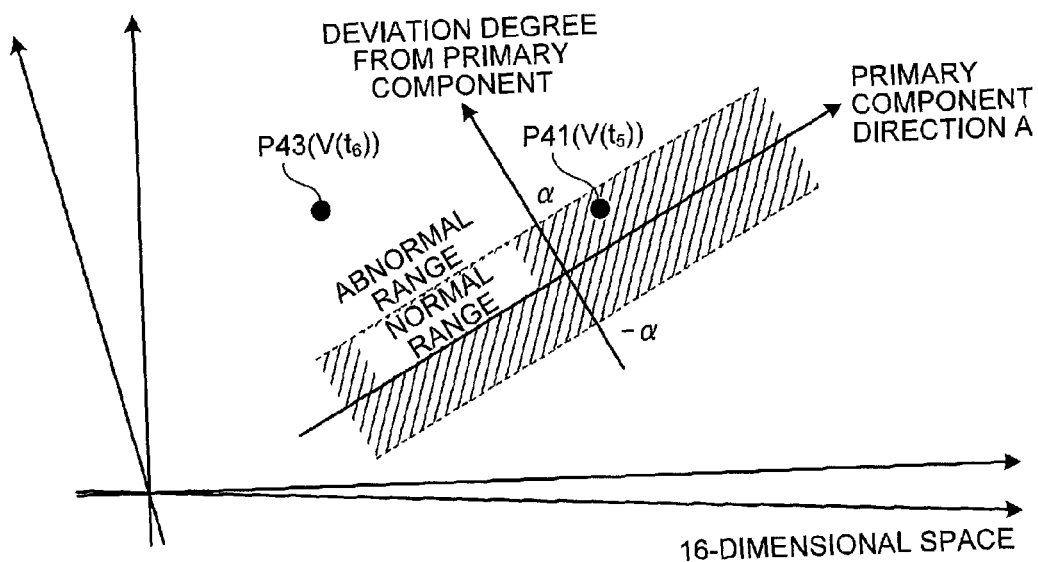
FIG. 21 is a view for explaining abnormality determination using the evaluation value.

In the abnormality determination using the evaluation value, abnormality is determined based on whether the evaluation value, that is, a ratio of the components deviated from the principal component belongs to a normal range previously defined as a threshold range of equal to or larger than $-\alpha$ and equal to or smaller than a as indicated by a hatched portion in FIG. 21 or belongs to an abnormal range out of the threshold range. For example, when the evaluation value is within the threshold range as in a representative brightness vector $V(t_5)$ that is expressed by a point P41 in the 16-dimensional space, the condition of the blast furnace 1 is determined to be normal. On the other hand, when the evaluation value is out of the threshold range as in a representative brightness vector $V(t_6)$ that is expressed by a point P43, the condition of the blast furnace 1 is determined to be abnormal.

Figure 22:
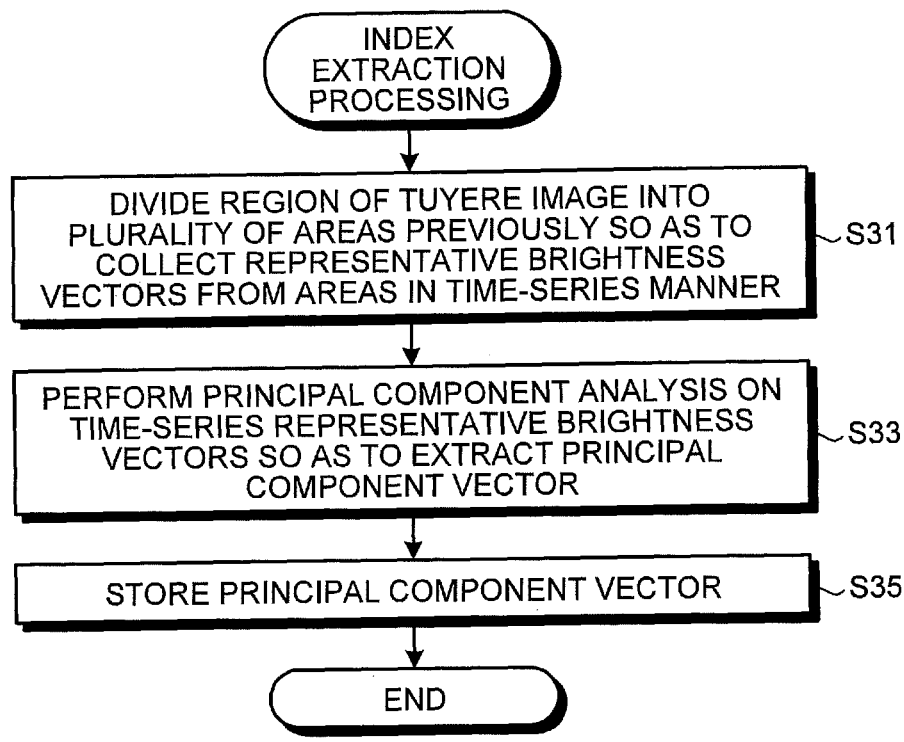
FIG. 22 is a flowchart illustrating processing procedures of index extraction processing.
Figure 23:
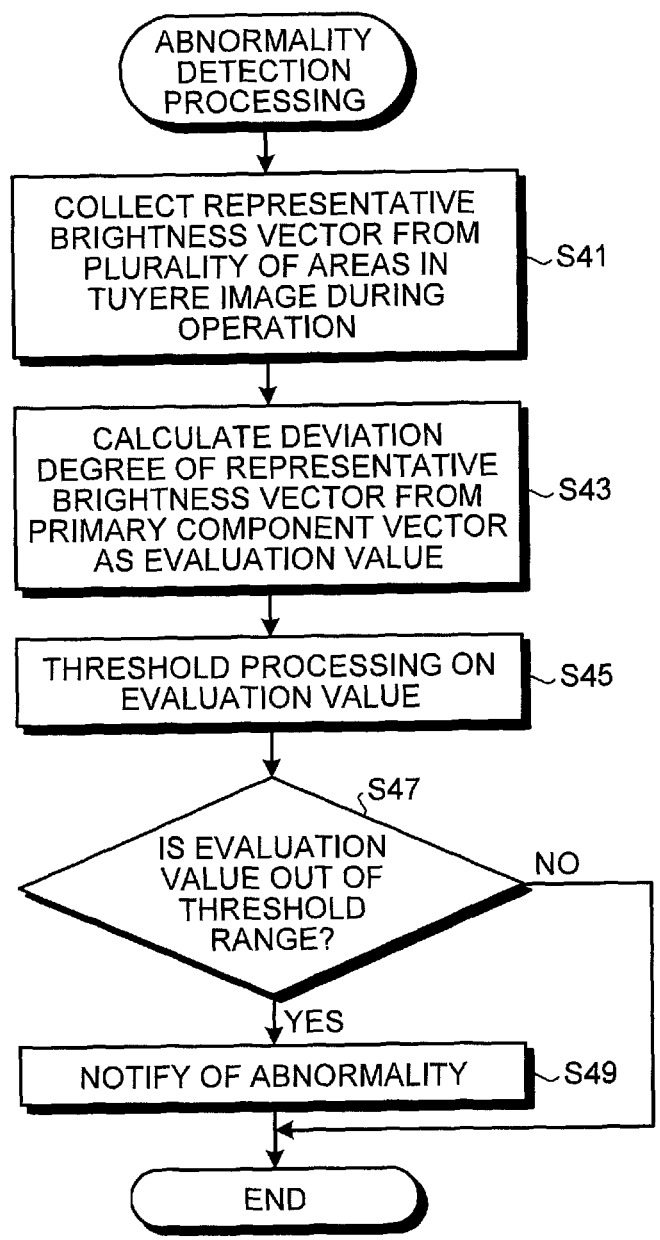
FIG. 23 is a flowchart illustrating processing procedures of abnormality detection processing.

Next, detail processing procedures that are performed by the abnormality detection device 10 will be described. FIG. 22 is a flowchart illustrating processing procedures of the index extraction processing that is performed by the image processing device 7. FIG. 23 is a flowchart illustrating processing procedures of the abnormality detection processing that is performed by the image processing device 7. After the image processing device 7 performs the index extraction processing in accordance with the processing procedures in FIG. 22 in advance, the image processing device 7 performs the abnormality detection processing in accordance with the processing procedures in FIG. 23. With these pieces of processing, the abnormality detection device 10 executes an abnormality detection method and a blast furnace operation method.

That is to say, in the index extraction processing, first, the representative brightness vector $V(t)$ is collected from the tuyere image that is transferred from the image acquisition device 5 at a timing with a predetermined time interval, for example, previously (step S31; collection step). To be specific, the region dividing unit 771 first divides the region of the tuyere image shot by the tuyere camera 31 at the corresponding timing into a plurality of (in the embodiment, 16) areas. Subsequently, the representative brightness vector collection unit 773 determines the representative brightnesses based on the brightness values of the respective pixels for the respective areas so as to provide the representative brightness vector $V(t)$ as expressed by the above-mentioned equation 3 defined by the determined representative brightnesses of the respective areas. Then, the region dividing unit 771 and the representative brightness vector collection unit 773 collect the representative brightness vectors $V(t)$ for a predetermined period of time so as to collect a series of the representative brightness vectors $V(t)$ in the time-series manner.

At a subsequent step S33, the index extraction unit 775 performs the principal component analysis on the series of representative brightness vectors $V(t)$ collected in the past operation as described above so as to extract the principal component vector A (extraction step). Then, the index extraction unit 775 stores the extracted principal component vector A in the recording unit 75 (step S35).

In the operation after the index extraction processing performed as described above, the abnormality detection processing as illustrated in FIG. 23 is executed at a predetermined time interval, for example. In the abnormality detection processing, first, pieces of processing at step S41 to step S43 are performed as a calculation step. That is to say, the region dividing unit 771 divides the region of the tuyere image transferred from the image acquisition device 5 into the areas at the corresponding timing with the same procedure as that at step S31 in FIG. 22 and the representative brightness vector collection unit 773 collects the representative brightness vector $V(t)$ from the respective areas (step S41). Thereafter, the abnormality detection processor 777 reads the principal component vector A from the recording unit 75 and calculates $\sqrt{[\{V(t)\}^2 - \{A^t \cdot V(t)\}^2]}$ as the evaluation value using an inner product $A^t \cdot V(t)$ of the representative brightness vector $V(t)$ collected at step S41 and the read principal component vector A (step S43).

Subsequently, pieces of processing at step S45 to step S47 are performed as an abnormality detection step. That is to say, the abnormality detection processor 777 performs threshold processing on the evaluation value calculated at step S43 (step S45) so as to determine whether the evaluation value is within the predetermined threshold range based on the following equation (4) (step S47).

$$0 \leq \sqrt{\{V(t)\}^2 - \{A^t \cdot V(t)\}^2} \leq \alpha \qquad (4)$$

When the evaluation value is out of the threshold range (Yes at step S47), the abnormality detection processor 777 determines that abnormality has been generated in the blast furnace 1 and performs processing of warning of and displaying the abnormality on the display unit 73 (step S49). It is sufficient that the processing enables the operator to be notified of at least the generation of the abnormality in the blast furnace 1 and a warning sound may be output from an output device such as a speaker so as to notify the operator of the generation of the abnormality alternatively. Furthermore, an operation condition of the blast furnace 1 is controlled in accordance with the determination whether the abnormality has been generated in the blast furnace 1 at step S49 so as to address the generated abnormality.

As described above, in the embodiment, the region of the tuyere image shot by the tuyere camera 31 is divided and the representative brightness vector V(t) formed by a set of representative brightnesses for the respective areas is collected. Then, the principal component analysis is performed on the collected representative brightness vector V(t) and the principal component vector A is extracted as the index. Thereafter, the deviation degree from the principal component that is computed by the inner product of the representative brightness vector V(t) collected during the operation and the principal component vector A, and the like, is calculated as the evaluation value so as to detect generation of the abnormality.

With these pieces of processing, the brightness value in the tuyere image shot by the tuyere camera 31 in the vicinity of the tuyere 11 of the blast furnace 1 is considered for each area and generation of a condition (abnormality) different from the condition of the blast furnace 1 in the normal condition in the vicinity of the tuyere 11 for which the tuyere camera 31 is installed can be detected in the blast furnace 1 during the operation when the brightness value unevenly changes in the unanticipated direction different from the direction of the normal furnace condition change partially. Accordingly, the condition different from the normal condition that has been generated in the vicinity of the tuyere 11 can be detected with high accuracy.

INDUSTRIAL APPLICABILITY

The present invention can be applied to processing of detecting abnormality of a blast furnace from a tuyere image shot by a camera installed in the vicinity of a tuyere of the blast furnace.

REFERENCE SIGNS LIST

1 BLAST FURNACE
11 TUYERE
13 BLAST TUBE
15 LANCE
17 RACEWAY
21 IRON ORE
23 COKE
25 HOT METAL
27 SLAG
10 ABNORMALITY DETECTION DEVICE
3 TUYERE OBSERVATION UNIT
31 (31-1 TO 31-8) TUYERE CAMERA
5 IMAGE ACQUISITION DEVICE
7 IMAGE PROCESSING DEVICE
71 INPUT UNIT
73 DISPLAY UNIT
75 RECORDING UNIT
77 PROCESSOR
771 REGION DIVIDING UNIT
773 REPRESENTATIVE BRIGHTNESS VECTOR COLLECTION UNIT
775 INDICATOR EXTRACTION UNIT
777 ABNORMALITY DETECTION PROCESSOR

The invention claimed is:

1. An abnormality detection method of detecting abnormality of a blast furnace from tuyere images shot by cameras installed in vicinities of a plurality of tuyeres of the blast furnace, the abnormality detection method comprising:
collecting, in a time-series manner, representative brightness vectors defined by representative brightnesses determined based on brightness values of respective pixels for each of the tuyeres image previously shot by the cameras at a same time;
extracting a principal component vector by performing principal component analysis on the representative brightness vectors collected in the time-series manner;
calculating, as an evaluation value, a length of a normal line drawn in a direction of the principal component vector from the representative brightness vector collected from the tuyere images shot by the cameras at the same time during an operation; and
detecting the abnormality of the blast furnace by comparing the evaluation value with a predetermined threshold.

2. The abnormality detection method according to claim 1, wherein the representative brightness vector is collected while maximum values of the brightness values in the tuyere images are set to the representative brightnesses.

3. The abnormality detection method according to claim 1, wherein the representative brightness vector is collected while average values of the brightness values in the tuyere images are set to the representative brightnesses.

4. The abnormality detection method according to claim 1, wherein the representative brightness vector is collected while minimum values of the brightness values in the tuyere images are set to the representative brightnesses.

5. An abnormality detection method of detecting abnormality of a blast furnace from a tuyere image shot by a camera installed in a vicinity of a tuyere of the blast furnace, the abnormality detection method comprising:
collecting, in a time-series manner, representative brightness vectors defined by representative brightnesses determined based on brightness values of respective pixels for a plurality of areas formed by dividing a region of the tuyere image previously shot by the camera into the areas;
extracting a principal component vector by performing principal component analysis on the representative brightness vectors collected in the time-series manner;
calculating, as an evaluation value, a length of a normal line drawn in a direction of the principal component vector from the representative brightness vector collected from the tuyere image shot by the camera during an operation; and
detecting the abnormality of the blast furnace by comparing the evaluation value with a predetermined threshold.

6. The abnormality detection method according to claim 5, wherein the representative brightness vector is collected while maximum values of the brightness values in the respective areas are set to the representative brightnesses.

7. The abnormality detection method according to claim 5, wherein the representative brightness vector is collected while average values of the brightness values in the respective areas are set to the representative brightnesses.

8. The abnormality detection method according to claim 5, wherein the representative brightness vector is collected while minimum values of the brightness values in the respective areas are set to the representative brightnesses.

9. A blast furnace operation method comprising:

detecting abnormality of a blast furnace using the abnormality detection method, the abnormality detection method detecting abnormality of a blast furace from tuyere image shot by cameras installed in vicinities of a plurality of tuyeres the blast furnace and including:

collecting, in a time-series manner,representative brightness vectors defined by representative brightness determined based on brightness value of respective pixels for each of the tuyeres image preyiously shot by the cameras at same time;

extracting a principal component vector by performing principal component analysis on the representative brightness vectors collected in the time series manner;

calculating as an evaluation vaule, a length of a normal line drawn in a direction of the principal component vector from the representative brightness vector collected from the tuyere images shot by by the cameras at the same time during an operation; and dectecting the abnomality of the blast furnace by comparing the evaluation value with predetermined threshold; and controlling an operation condition of the blast furnace based on whether the abnormality of the blast furnace has been detected.

10. The blast furnace operation method according to claim 9, wherein the representative brightness vector is collected while maximum values of the brightness values in the tuyere images are set to the representative brightnesses.

11. The blast furnace operation method according to claim 9, wherein the representative brightness vector is collected while average values of the brightness values in the tuyere images are set to the representative brightnesses.

12. The blast furnace operation method according to claim 9, wherein the representative brightness vector is collected while minimum values of the brightness values in the tuyere images are set to the representative brightnesses.

13. A blast furnace operation method comprising:

detecting abnormality of a blast furnace using the an abnormality detection method, the abnormality detection method detecting abnormality of a blast furnace from a tuyere image shot by a camera installed in a vicinity of a tuyere of the blast furnace and including:

collecting, in a time-series manner, representative brightness vectors defined by representative brightnesses determined based on brightness values of respective pixels for a plurality of areas formed by dividing a region of the tuyere image previously shot by the camera into the areas;

extracting a principal component vector by performing principal component analysis on the representative brightness vectors collected in the time-series manner;

calculating, as an evaluation value, a length of a normal line drawn in a direction of the principal component vector from the representative brightness vector collected from the tuyere image shot by the camera during an operation; and detecting the abnormality of the blast furnace by comparing the evaluation value with a predetermined threshold; and controlling an operation condition of the blast furnace based on whether the abnormality of the blast furnace has been detected.

14. The blast furnace operation method according to claim 13, wherein the representative brightness vector is collected while maximum values of the brightness values in the respective areas are set to the representative brightnesses.

15. The blast furnace operation method according to claim 13, wherein the representative brightness vector is collected while average values of the brightness values in the respective areas are set to the representative brightnesses.

16. The blast furnace operation method according to claim 13, wherein the representative brightness vector is collected while minimum values of the brightness values in the respective areas are set to the representative brightnesses.

* * * * *